(12) United States Patent
Tsai

(10) Patent No.: US 8,066,294 B2
(45) Date of Patent: Nov. 29, 2011

(54) PORTABLE JOGGING TRICYCLE

(76) Inventor: Hui-Te Tsai, Taipei (TW)

( * ) Notice: Subject to any disclaimer, the term of this patent is extended or adjusted under 35 U.S.C. 154(b) by 17 days.

(21) Appl. No.: 12/776,370

(22) Filed: May 8, 2010

(65) Prior Publication Data

US 2010/0301582 A1 Dec. 2, 2010

(30) Foreign Application Priority Data

May 27, 2009 (TW) .............................. 98117707 A

(51) Int. Cl.
*B62M 1/00* (2010.01)
(52) U.S. Cl. ........ 280/278; 280/210; 280/287; 280/267; 482/51; 482/910
(58) Field of Classification Search .................. 280/278, 280/30, 221, 220, 228, 257, 267, 287, 304, 280/304.5, 249, 253; 482/51, 52, 57, 908, 482/910
See application file for complete search history.

(56) References Cited

U.S. PATENT DOCUMENTS

| | | | | |
|---|---|---|---|---|
| 1,350,232 A * | 8/1920 | Moir | | 280/257 |
| 1,929,081 A * | 10/1933 | Serpico | | 280/222 |
| 2,508,189 A * | 5/1950 | Pierce | | 280/221 |
| 4,451,055 A * | 5/1984 | Lee | | 280/221 |
| 5,520,401 A * | 5/1996 | Mohseni | | 280/221 |
| 5,527,246 A * | 6/1996 | Rodgers, Jr. | | 482/57 |
| 5,591,107 A * | 1/1997 | Rodgers, Jr. | | 482/57 |
| 5,690,589 A * | 11/1997 | Rodgers, Jr. | | 482/57 |
| 5,921,894 A * | 7/1999 | Eschenbach | | 482/57 |
| 6,715,779 B2 * | 4/2004 | Eschenbach | | 280/221 |
| 7,140,626 B1 * | 11/2006 | Keay | | 280/230 |
| 7,422,548 B1 * | 9/2008 | Teng | | 482/51 |
| 7,967,313 B1 * | 6/2011 | Eggert | | 280/224 |
| 2002/0098950 A1 * | 7/2002 | Chen | | 482/52 |
| 2004/0157706 A1 * | 8/2004 | Miller | | 482/52 |
| 2010/0248903 A1 * | 9/2010 | Cardile | | 482/51 |

* cited by examiner

*Primary Examiner* — Anne Marie Boehler
*Assistant Examiner* — Tashiana Adams

(57) ABSTRACT

A portable jogging tricycle includes a main frame, a handle base, a rear wheel support frame connected to opposite sides of the handle base, two front wheel support frames and two foldable frames attached between the handle base and the front wheel support frame. The foldable frame includes a plurality of scissor lifts and is used for folding the two front wheel support frames close to the handle base. The main frame includes a plurality of pivoted arms for folding the main frame together to fold in the handle base and the rear wheel support frame.

14 Claims, 14 Drawing Sheets

PORTABLE JOGGING TRICYCLE

BACKGROUND OF THE INVENTION

1. Field of the Invention

The present invention relates to a tricycle, and more particularly to a portable jogging tricycle.

2. Description of the Related Art

Currently, with more convenient transportation options, such as motorcycles, cars, trains, subways, and elevators, people have less and less opportunity to exercise, and busy modern lifestyles are causing increasing numbers of people to be less and less healthy. Consequently, some people have added exercise regimens to their daily routines, such as bicycle riding. Furthermore, in typical metropolitan areas, parking spaces are difficult to find and fuel prices are high, and so more and more people are choosing two-wheeled vehicles, such as bicycles or motorcycles, for their mode of daily transportation.

However, most people would prefer to reduce their commuting times to have time for other activities, and so riding a bicycle is more practical for relatively short commuting distances. But, in typical metropolitan areas, people still usually need to walk from public transportation stops to their final destinations. Therefore, some people like to ride and carry bicycles instead of walking to save on commute time.

Nevertheless, typical bicycles are not very portable, and so it is difficult to travel with them when using public transportation. Some foldable bicycles can be folded up into smaller sizes, but a folded bicycle is not itself mobile and so needs to be lifted and carried around.

Furthermore, current jogging exercise machines are in the form of treadmills, which provide a rolling belt upon which a user runs. However, this machine is an indoor exercise machine which may make the user feel that exercising with it is boring.

Therefore, it is desirable to provide a portable jogging tricycle to mitigate and/or obviate the aforementioned problems.

SUMMARY OF THE INVENTION

An objective of the present invention is to provide a portable jogging tricycle, which is easy to travel with and that provides an exciting exercising option.

In order to achieve the above-mentioned objectives, a portable jogging tricycle comprises a main frame having two ends respectively connected to a handle base and a rear wheel support frame. A first guiding slot is disposed adjacent to a bottom end of the handle base, and a rear wheel is pivoted to a bottom end of the rear wheel support frame. At least two front wheel support frames are respectively connected to both sides of the handle base, with a front wheel pivoted to a bottom of each front wheel support frame to form a common plane with the two front wheels and the rear wheel. A second guiding slot is disposed adjacent to a bottom end of each front wheel support frame and is symmetrical with the first guiding slot of the handle base. At least two foldable frames are respectively attached to each front wheel support frame on both sides of the handle base and comprise a plurality of scissor lifts pivoted between the handle base and the front wheel support frame. Ends of at least two scissor lifts of the foldable frame are respectively slidably attached to the first and second guiding slots of the handle base and the front wheel support frame to close or open the foldable frames. The first and second guiding slots help to horizontally close or open the foldable frames. Therefore, the two front wheels and the front wheel support frames are simultaneously and horizontally pulled together, which reduces the width of the tricycle of the present invention. A first pivot shaft is disposed at a top end of the handle base above the first guiding slot, a second pivot shaft is disposed at a top end of the front wheel support frame, and an end of each scissor lift of the foldable frames is pivoted onto the first pivot shaft and the second pivot shaft.

The foldable frames comprise a first rod having one end pivoted onto the first pivot shaft of handle base; a second rod having one end pivoted onto the second pivot shaft of the front wheel support frame, and other ends of the first rod and the second rod being pivoted together; a third rod having one end slidably attached to the first guiding slot of the handle base, and a middle position of the third rod pivoted onto a middle position of the first rod; and a fourth rod having one end attached to the second guiding slot of the front wheel support frame, other ends of the third rod and the fourth rod being pivoted together, and a middle position of the fourth rod being pivoted onto a middle position of the second rod.

In another embodiment, a portable jogging tricycle comprises a main frame having two ends respectively connected to a handle base and a rear wheel support frame. A front slot is disposed on a bottom end of the handle base, and a rear slot is disposed on a bottom end of the rear wheel support frame. A rear wheel is pivoted to a bottom end of the rear wheel support frame. At least two front wheel support frames are respectively connected to both sides of the handle base. A front wheel is pivoted to a bottom of each front wheel support frame to form a common plane with the two front wheels and the rear wheel. The main frame further comprises a plurality of scissor lifts pivoted between the handle base and the rear wheel support frame. Ends of at least two scissor lifts of the main frame are respectively attached to the front and rear slots to expand the handle base and the rear wheel support frame and are capable of detaching from the front and rear slots to fold up the handle base and the rear wheel support frame together to reduce the length of the tricycle. A first pivot shaft is disposed on a top end of the handle base above the front slot, a second pivot shaft is disposed on a top end of the rear wheel support frame, and an end of each scissor lift of the foldable frames is pivoted onto the first pivot shaft and the second pivot shaft.

The main frame further comprises a first arm having one end pivoted onto the first pivot shaft of the handle base, and another end of the first arm attached to the rear slot; a second arm having one end pivoted onto the second pivot shaft of the rear wheel support frame, another end of the second arm attached to the front slot, and a middle position of the second arm pivoted onto a middle position of the first arm; a first pole having one end pivoted to a middle position of the handle base and another end pivoted between a middle position of the second arm and its lower end to guide the lower end of the second arm to engage or disengage with the front slot; and a second pole having one end pivoted to a middle position of the rear wheel support frame and another end pivoted between a middle position of the first arm and its lower end to guide the lower end of the first arm to engage or disengage with the rear slot. The front slot faces downward and toward the rear wheel support frame, and the rear slot faces downward and toward the handle base. A foldable mechanism is disposed between the handle and the handle base and used for folding up or opening the handle. A folding mechanism is disposed on the lower telescoping tube and between the handle and the handle base and is used for folding up or opening the handle 6. Therefore, the handle is shortened into the handle base to reduce the height of the tricycle.

The rear wheel support frame further comprises a gear set. The rear wheel is driven by the gear set, and two pedal are respectively installed on both sides of the rear wheel support frame and used for driving the gear set. The gear set comprises a first large gear coaxially arranged with the pedals and driven by the pedals; a first small gear placed below the first large gear, engaged with the first large gear, and being driven by the first large gear; a second large gear coaxially arranged with the first small gear and driven by the first small gear; and a second small gear placed below the second large gear, engaged with the second large gear, and coaxially arranged with the rear wheel and driven by the second large gear. The gear set has all gear parts to avoid use of a chain that can become loose, is noisy and parties subject to breakage.

A seat is installed on the top of the rear wheel support frame, and a plurality of telescoping tubes are disposed between the seat and the rear wheel support frame so that the seat can be lifted or lowered.

A shock absorber is installed between the front wheel and the front wheel support frame.

Accordingly, the two front wheels and the rear wheel are aligned on the ground to form a common plane, so that the user can stably stand on the rear wheel support frame, even when the user pedals the two pedals. The relative positions among the handle and the two pedals are designed based upon the typical human jogging posture; in other words, the movements of the two pedals are similar to the jogging movement of two legs. Furthermore, a relative distance and position between the two foldable frames and the main frame are also designed based upon the normal human jogging posture, and the height of the handle is adjustable. Therefore, the relative distances and positions among the handle, the rear wheel support frame and the two pedals satisfy ergonomics and kinesiology. Accordingly, the user can be in an upright posture while jogging and stepping on the two pedals to drive the gear set to rotate the rear wheel to drive the front wheels. Consequently, the user can ride the tricycle outdoors and perform jogging exercises at the same time for more variety in his or her exercise routine.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
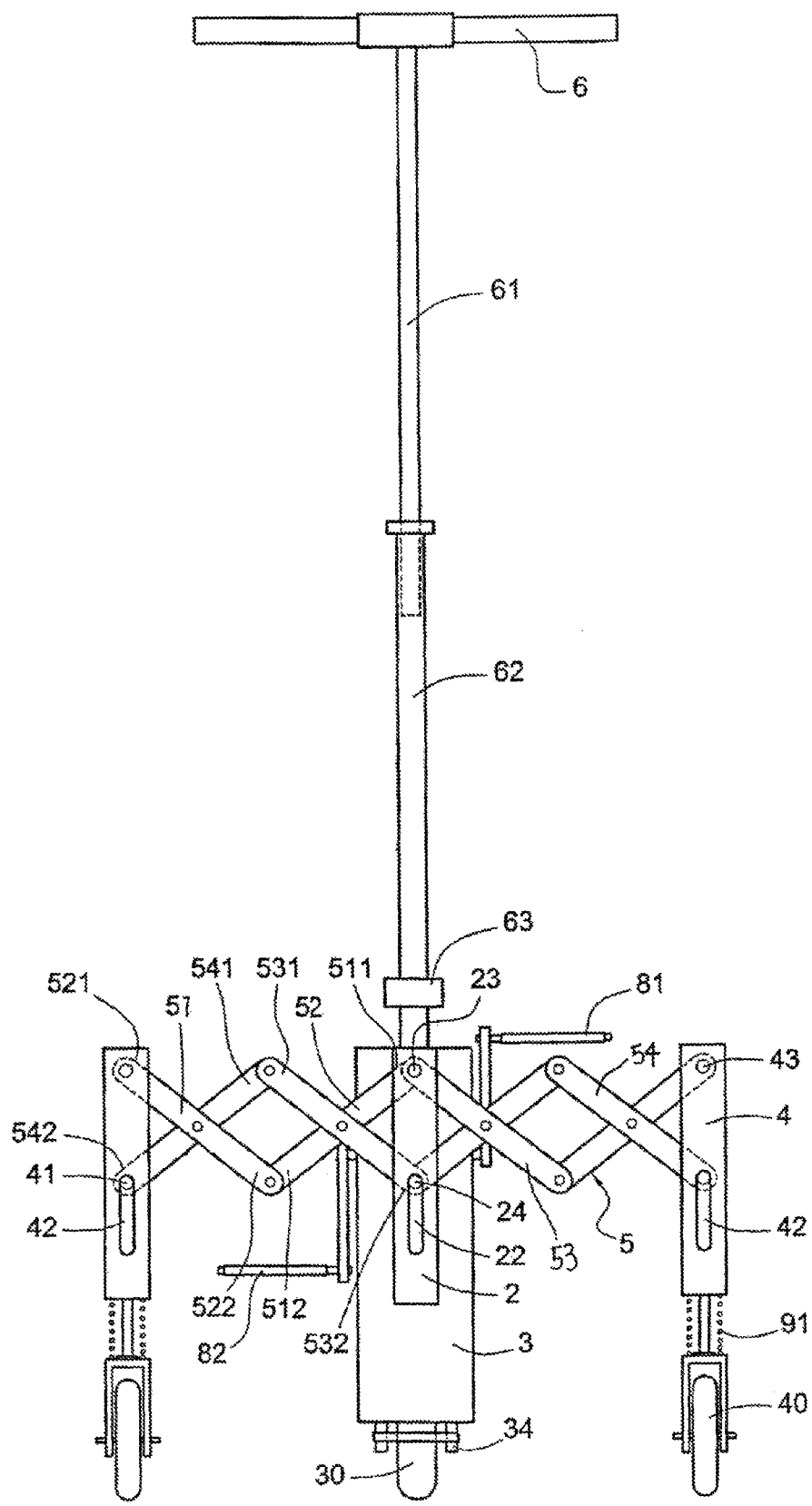
FIG. 1 is a schematic drawing of a first embodiment of the present invention.
Figure 6:
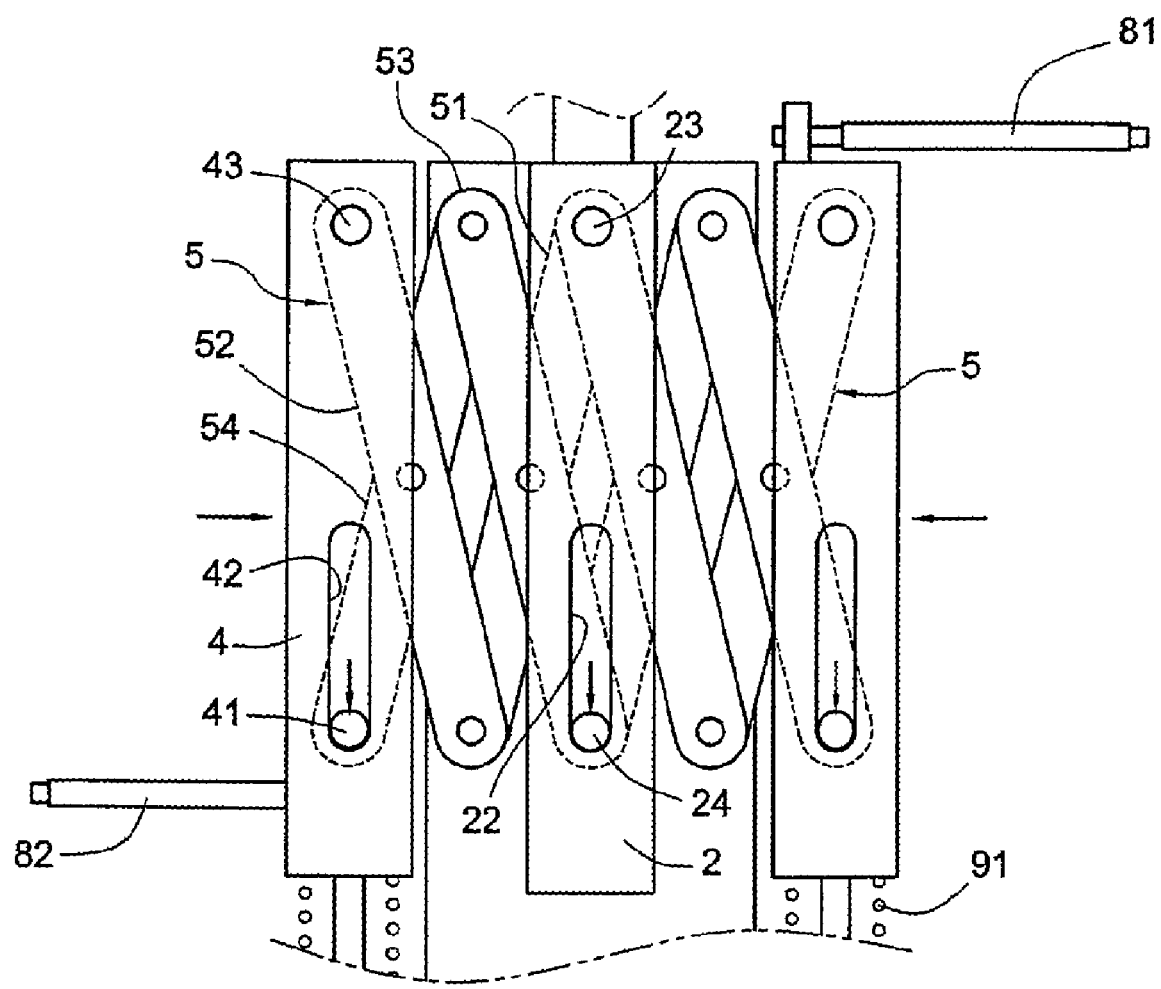
FIG. 6 illustrates usage of a foldable frame of the present invention.
Figure 7:
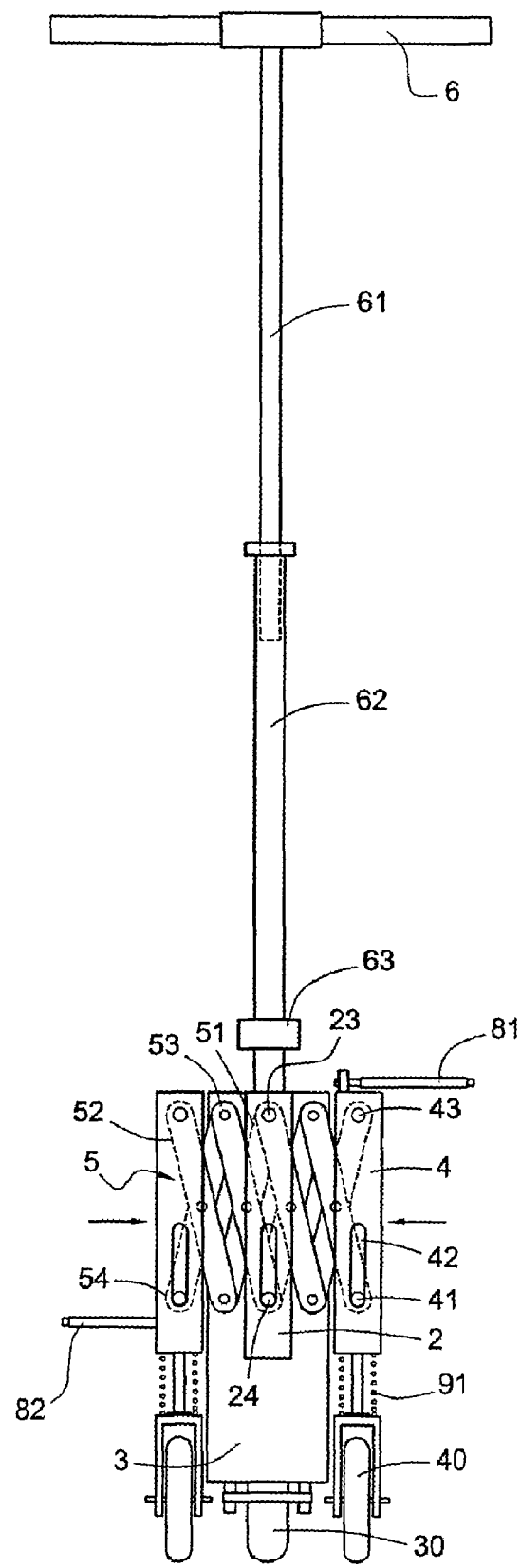
FIG. 7 illustrates usage of the device shown in FIG. 1.
Figure 8:
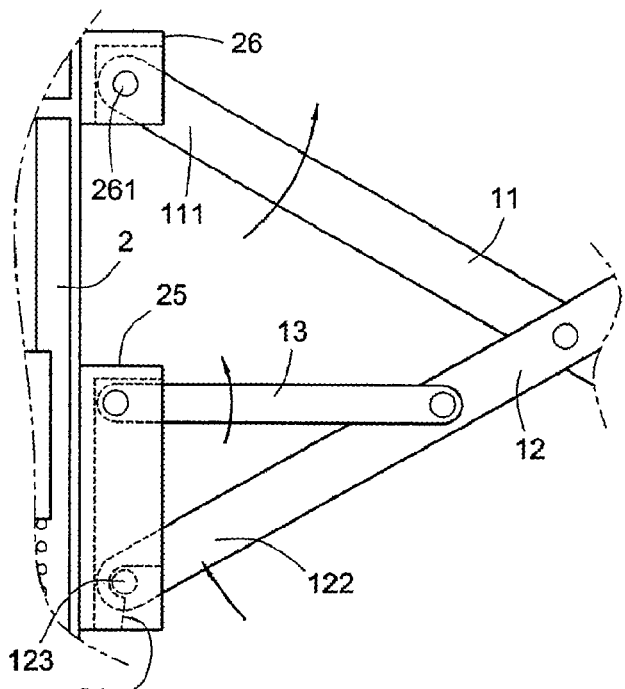
FIG. 8 is a schematic drawing of a first arm, a second arm and a handle base according to the present invention.
Figure 9:
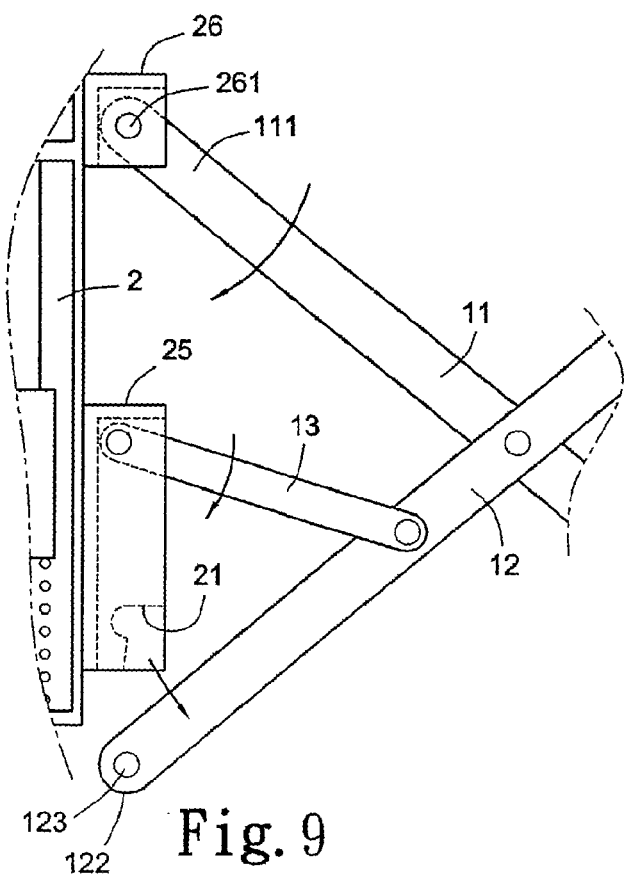
FIG. 9 illustrates usage of the device shown FIG. 8.
Figure 10:
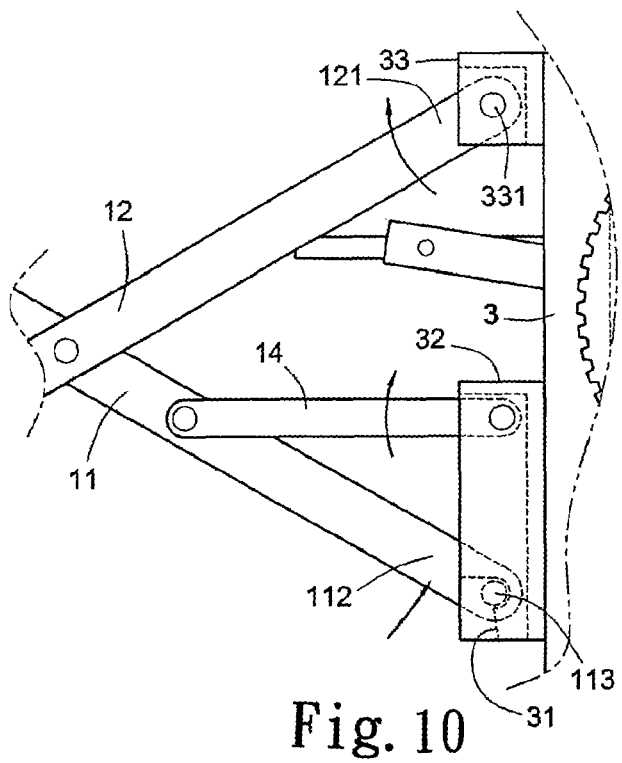
FIG. 10 is a schematic drawing of the first arm, the second arm and a rear wheel support frame according to the present invention.
Figure 11:
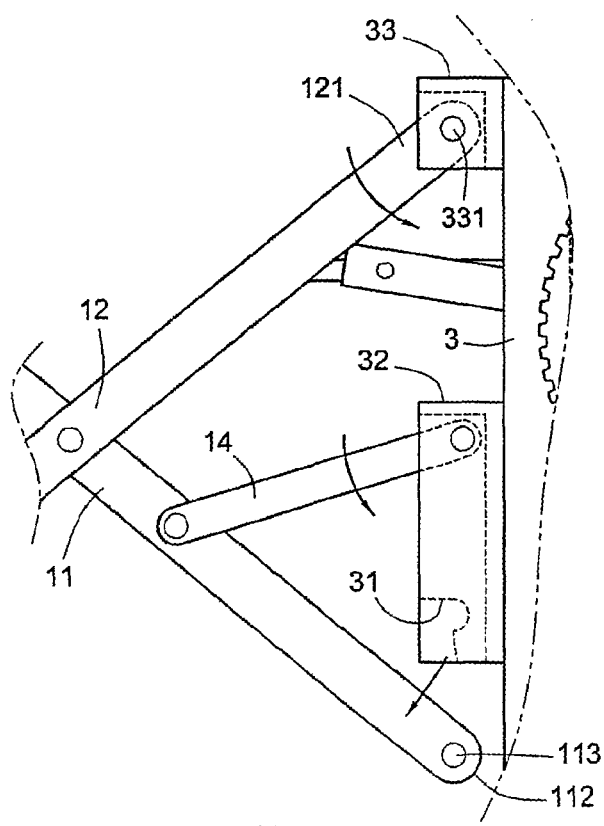
FIG. 11 illustrates usage of the device shown FIG. 10.

Please refer to FIG. 1. FIG. 1 is a schematic drawing of a first embodiment of the present invention. Please also refer to both FIG. 2 and FIG. 4. A portable jogging tricycle of the present invention comprises a main frame 1, a handle base 2, a rear wheel support frame 3, two front wheel support frames 4 and two foldable frames 5. The main frame 1 has two ends respectively connected to the handle base 2 and the rear wheel support frame 3. A first guiding slot 22 is vertically disposed adjacent to one side of a bottom end of the handle base 2 (as shown in FIG. 6). A front fillister 21 is disposed on another side of the bottom end of the handle base 2 (as shown in FIG. 8 and FIG. 9). A rear fillister 31 is disposed on a bottom end of the rear wheel support frame and facing the handle base 2 (as shown in FIG. 10 and FIG. 11), and a rear wheel 30 is pivoted to the bottom end of the rear wheel support frame 3. The two front wheel support frames 4 are respectively connected to opposite sides of the handle base 2. A front wheel 40 is pivoted to a bottom of each front wheel support frame 4 to form a common plane formed by the two front wheels 40 and the rear wheel 30. A second guiding slot is vertically disposed adjacent to a bottom end of each front wheel support frame 4 and is symmetrical with the first guiding slot 22 of the handle base 2. The two foldable frames 5 are respectively attached to each front wheel support frame 4 on both sides of the handle base 2, and the foldable frames 5 each comprise a plurality of scissor lifts 51, 52, 53, 54 that are pivoted to each other between the handle base 2 and the front wheel support frame 4. Ends 532, 542 of at least two scissor lifts 53, 54 of the foldable frame 5 are respectively slidably attached to the first and second guiding slots 22, 42 of the handle base 2 and the front wheel support frame 4, to horizontally close or open the foldable frames 5 (as shown in FIG. 7). Therefore, the two front wheels 40 and the front wheel support frames 4 are simultaneously and horizontally pulled together, which reduce the width of the tricycle of the present invention.

The main frame 1 further comprises a plurality of scissor lifts pivoted between the handle base 2 and the rear wheel support frame 3. Ends 112, 122 of at least two scissor lifts of the main frame 1 are respectively attached to the front and rear fillisters 21, 31 to expand and position the handle base 2 and the rear wheel support frame 3. Furthermore, the ends 112, 122 of at least two scissor lifts are capable of detaching from the front and rear fillisters 21, 31 to fold the handle base 2 and the rear wheel support frame 3 together, thereby reducing the length of the tricycle. It will be appreciated that more than one front and rear fillisters 21, 31 may be employed.

In a preferred embodiment, a first pivot shaft 23 is disposed at a top end of the handle base 2 above the first guiding slot 22 (as shown in FIG. 1 and FIG. 6), and a second pivot shaft 43 is disposed at a top end of the front wheel support frame 4 above the second guiding slot 42. The foldable frame 5 comprises a first rod 51, a second rod 52, a third rod 53 and a fourth rod 54. One end 511 of the first rod 51 is pivoted onto the first pivot shaft 23 of the handle base 2, one end 521 of the second rod 52 is pivoted onto the second pivot shaft 43 of the front wheel support frame 4. Another end 512 of the first rod 51 and another end 522 of the second rod 52 are pivoted together. One end 532 of the third rod 53 has a first shaft 24 that is slidably attached to the first guiding slot 22 of the handle base 2, and a middle position of the third rod 53 is pivoted onto a middle position of the first rod 51. One end 542 of the fourth rod 54 has a second shaft 41 that is slidably attached to the second guiding slot 42 of the front wheel support frame 4. Another end 531 of the third rod and another end 541 of the fourth rod 54 are pivoted together, and a middle position of the fourth rod 54 is pivoted onto a middle position of the second rod 52. The first rod and the second rod are respectively pivoted onto the first pivot shaft 23 of handle base 2 and the second pivot shaft 43 of the front wheel support frame 4, and the third rod 53 is slidably attached in the first guiding slot 22; therefore, the foldable frames can have simultaneous horizontal movement (as shown in FIG. 7).

Figure 2:
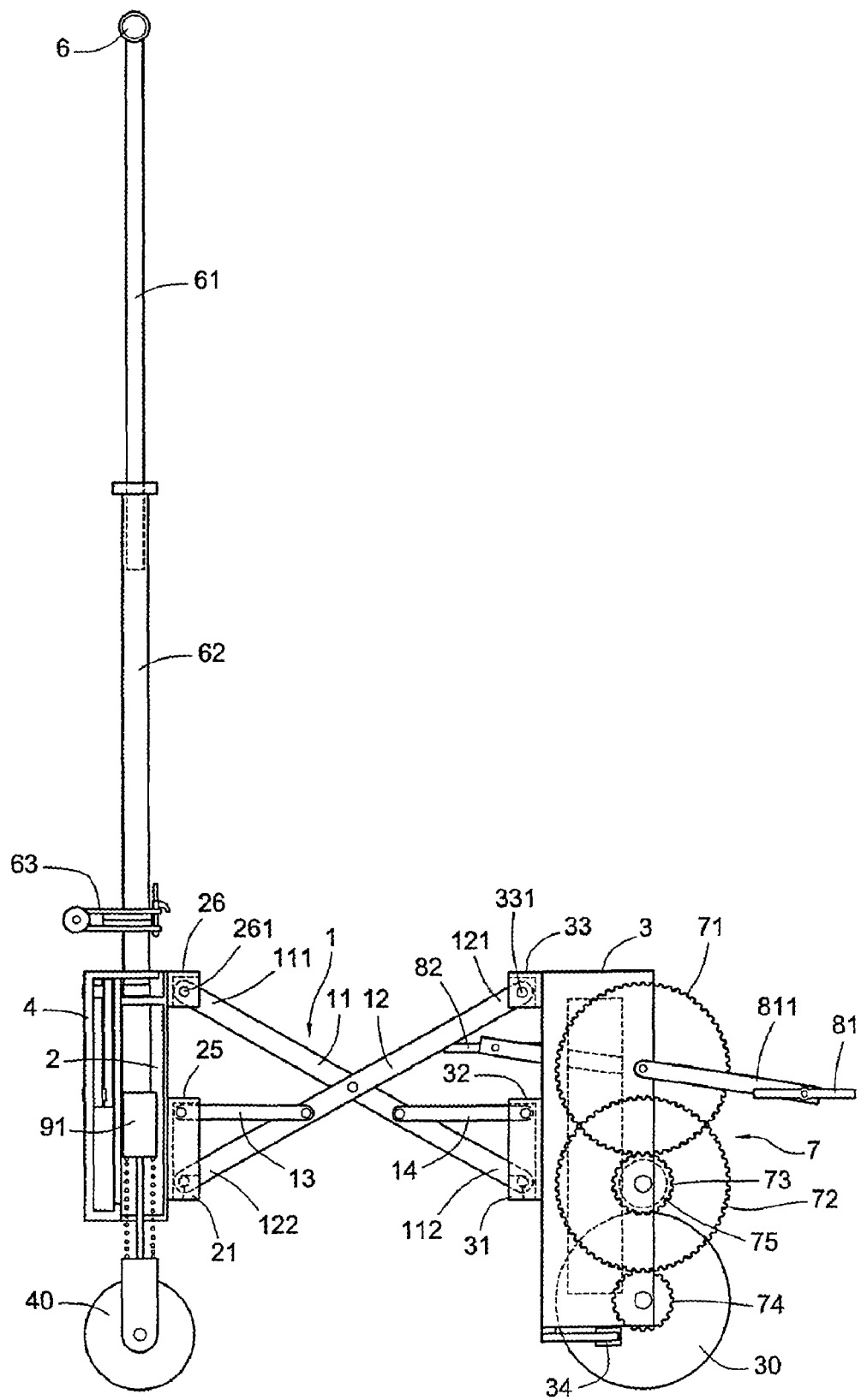
FIG. 2 is a side view of FIG. 1.
Figure 4:
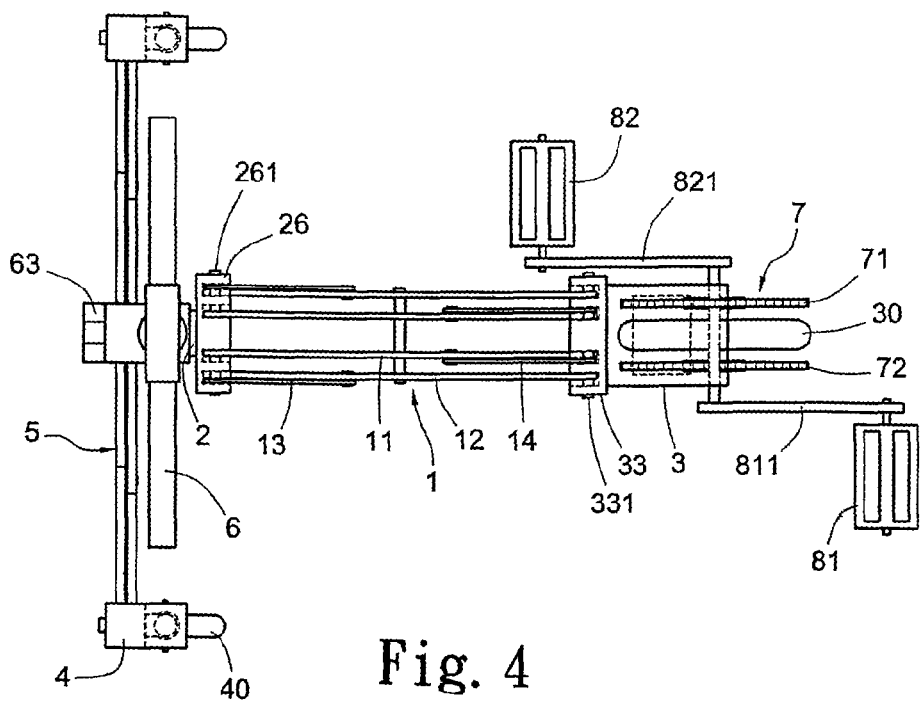
FIG. 4 is top view of FIG. 1.

Another side of the bottom end of the handle base 2 has a first lower bearing base 25 (as shown in FIG. 2, FIG. 8 and FIG. 9). The front fillister 21 is formed at a lower end of the first lower bearing base 25. One side of the bottom end of the rear wheel support frame 3 facing the handle base 2 has a second lower bearing base 32 (as shown in FIG. 10 and FIG. 11), and the rear fillister 31 is formed at a lower end of the second lower bearing base 32. A top end of the handle base 2 above the first lower bearing base 25 has a first upper bearing base 26 (as shown in FIG. 4), and a first pivot shaft 261 is pivoted on the first upper bearing base 26 above the front fillister 21. A top end of the rear wheel support frame 3 above the second lower bearing base 32 has a second upper bearing base 33, and a second pivot shaft 331 is pivoted on the second upper bearing base 33 above the rear fillister 31. The first and second upper bearing bases 26, 33, the first and second lower bearing bases 25, 32 and the first and second pivot shafts 261, 331 are symmetrically disposed on the main frame 1 and the front and rear fillisters 21, 31.

The main frame 1 further comprises a first arm 11, a second arm 12, a first pole 13 and a second pole 14 (as shown in FIG. 2 and FIG. 4). The first arm 11 has one end 111 pivoted onto the first pivot shaft 261 of the handle base 2 (as shown in FIG. 2 and FIG. 4), and another end 112 of the first arm 11 has a first shaft 113 attached to the rear fillister 31. The second arm 12 has one end 121 pivoted onto the second pivot shaft 331 of the rear wheel support frame 3, another end 122 of the second arm 12 having a second shaft 123 attached to the front fillister 21, and a middle position of the second arm 12 is pivoted onto a middle position of the first arm 11. The first pole 13 has one end pivoted onto a top end of the first lower bearing base 25 at a middle position of the handle base 2 and another end pivoted between the middle position of the second arm 12 and its lower end 122 to guide the second shaft 123 on the lower end of the second arm 12 to engage or disengage with the front fillister 21. The second pole 14 has one end pivoted onto a top end of the second lower bearing base 32 at a middle position of the rear wheel support frame 3 and another end pivoted between a middle position of the first arm and its lower end 112 to guide the first shaft 113 on the lower end of the first arm 11 to engage or disengage with the rear fillister 31.

Figure 12:
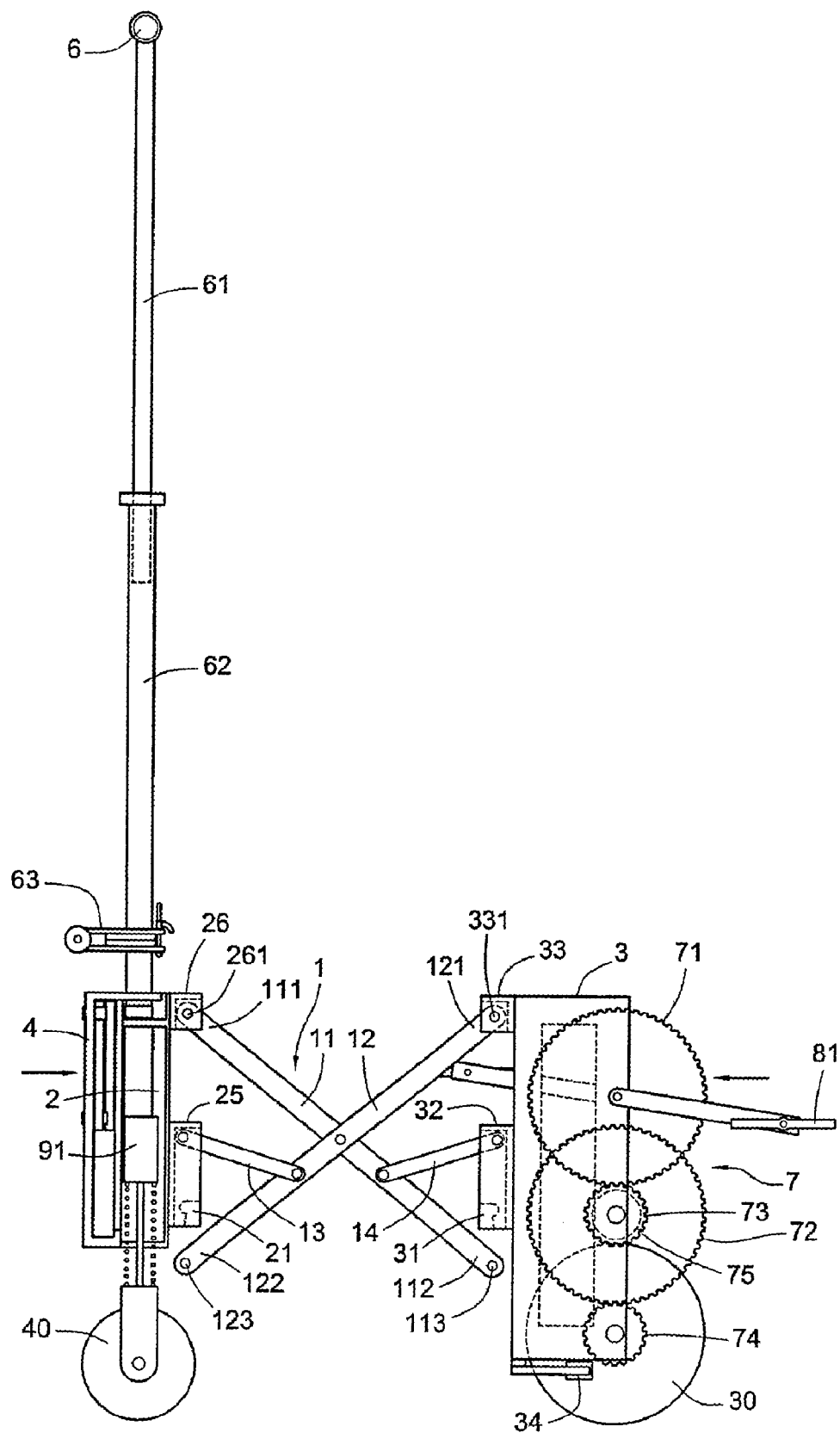
FIG. 12 is another drawing illustrating usage of the device shown in FIG. 2.
Figure 13:
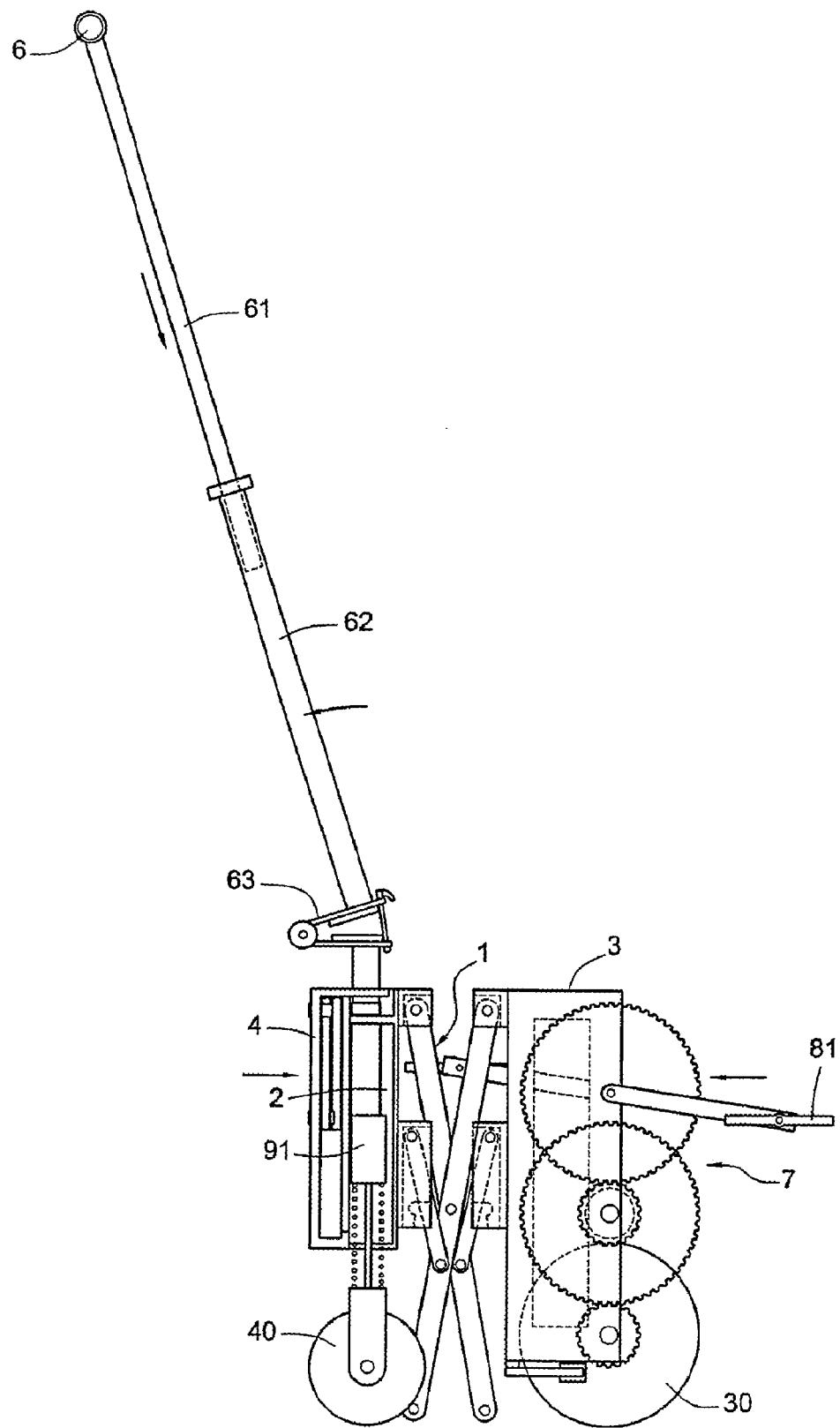
FIG. 13 is another drawing illustrating usage of the device shown in FIG. 12.

Therefore, the first and second arms 11, 12 at two ends of the main frame 1 are cross-pivoted to each other, and the first and second arms 11, 12 are respectively pivoted to the first pivot shaft 261 of the handle base 2 and the second pivot shaft 331 of the rear wheel support frame 3 so that the main frame 1 is capable of being folded and unfolded (as shown in FIG. 12 and FIG. 13).

Figure 14:
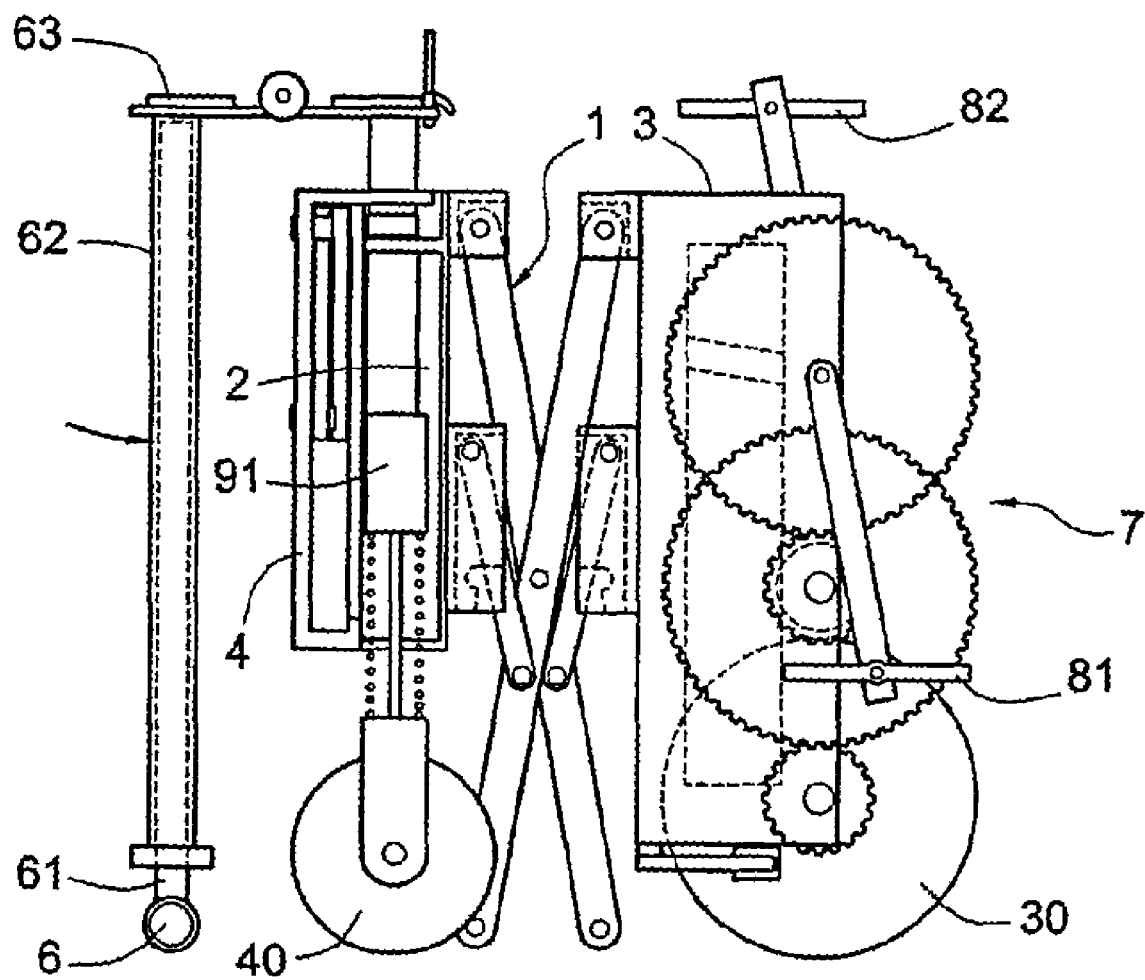
FIG. 14 is another drawing illustrating usage of the device shown in FIG. 13.

The handle base further includes a handle 6 (as shown in FIG. 1, FIG. 2, and FIG. 4) at its top end, and a plurality of telescoping tubes including a upper telescoping tube 61 are connected to the handle 6 and a lower telescoping tube 62 is connected to the handle base 2, which enable the handle 6 to be extended or shortened (as shown in FIG. 14). Moreover, a folding mechanism 63 is disposed on the lower telescoping tube 62 and between the handle 6 and the handle base 2 and is used for folding up or opening the handle 6. Therefore, the handle 6 may be shortened into the handle base 2 to reduce the height of the tricycle.

Figure 5:
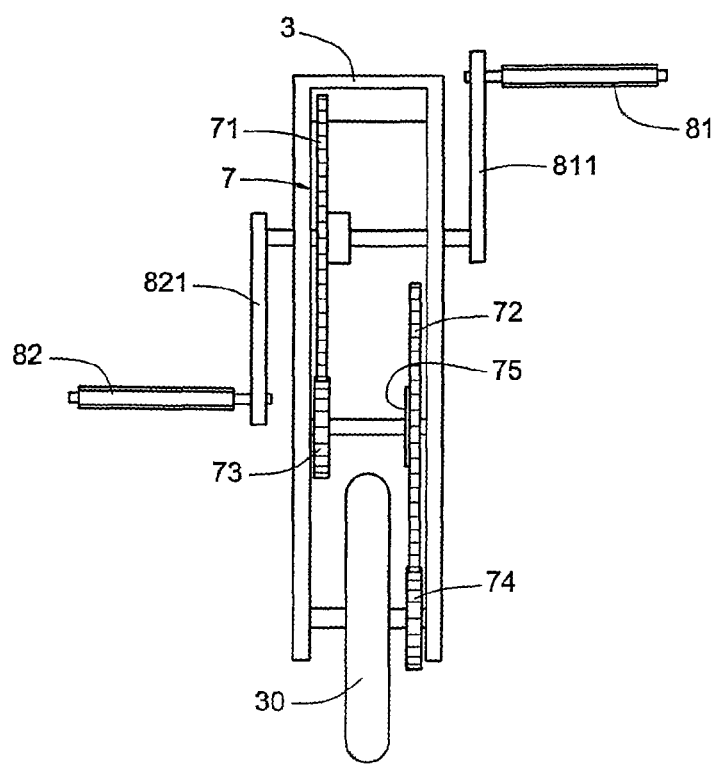
FIG. 5 is a schematic drawing of a gear set of the present invention.

Two pedals 81, 82 are respectively installed on both sides of the rear wheel support frame 3 (as shown in FIG. 1, FIG. 2, and FIG. 4), and the rear wheel support frame 3 further comprises a gear set 7. The pedals 81, 82 each respectively utilize a crank 811, 821 that is pivoted to respective opposite sides of the rear wheel support frame 3. The gear set 7 comprises a first large gear 71, a first small gear 73, a second large gear 72, and a second small gear 74 (as shown in FIG. 5). The first large gear 71 is coaxial with the cranks 811, 821 of the pedals and driven by the pedals 81, 82. The first small gear 73 is placed below the first large gear 71, engages with the first large gear 71, and is driven by the first larger gear 71. The second large gear 72 is engaged with a fly wheel 75 and is coaxial with the first small gear 73 and driven by the first small gear 73 through the fly wheel 75. The second small gear 74 is placed below the second large gear 72, engages with the second large gear 72, and is coaxial with the rear wheel 30 and driven by the second larger gear to rotate the rear wheel 30. Therefore the rear wheels are driven be the gear set 7, and the gear set 7 is driven by the pedals 81, 82. Furthermore, the gear set 7 comprises only gears so as to avoid the use of a chain, which can become loose, is noisy and is prone to fall part.

A shock absorber 91 is installed between the front wheel 40 and the front wheel support frame 4 (as shown in FIG. 1 and FIG. 2), to reduce shock and vibration while riding. And, a break set 34 is installed between the rear wheel support frame 30 and the rear wheel 30, to stop and release the rear wheel 30.

Figure 3:
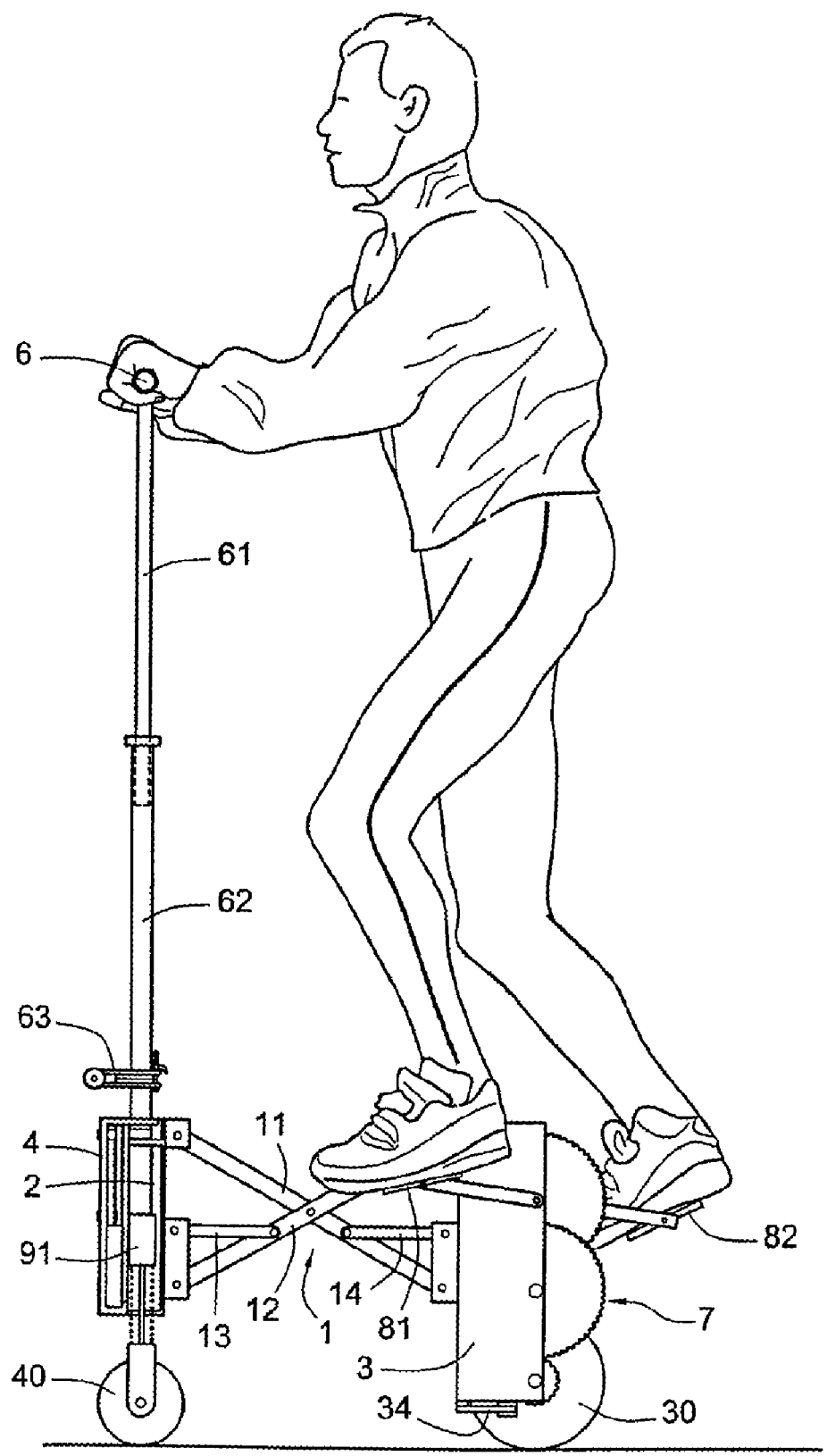
FIG. 3 illustrates usage of the view shown in FIG. 2.

Accordingly, the two front wheels 40 and the rear wheel 30 are aligned on the ground (as shown in FIG. 1, FIG. 2, and FIG. 4) to form a common plane, so the user can stably stand on the rear wheel support frame 3 (as shown in FIG. 3), even when the user pedals on the two pedals 81, 82. The relative positions among the handle 6 and the two pedals 81, 82 are designed based on the normal human jogging posture; in other words, the movements of the two pedals 81, 82 are similar to the jogging movements of two legs. Furthermore, the relative distance and position between the two foldable frames 5 and the main frame 1 are also designed based on the normal human jogging posture, and the height of the handle 6 is adjustable. Therefore, the relative distances and positions among the handle 6, the rear wheel support frame 3 and the two pedals 81, 82 are ergonomic and kinesiological. Accordingly, the user can stand up doing jogging-like exercises while stepping the two pedals 81, 82 to drive the gear set 7 to rotate the rear wheel 30 to drive the front wheels 40. Consequently, the user can ride the tricycle outdoor and do jogging exercises at the same time for a more varied exercise regimen.

Figure 15:
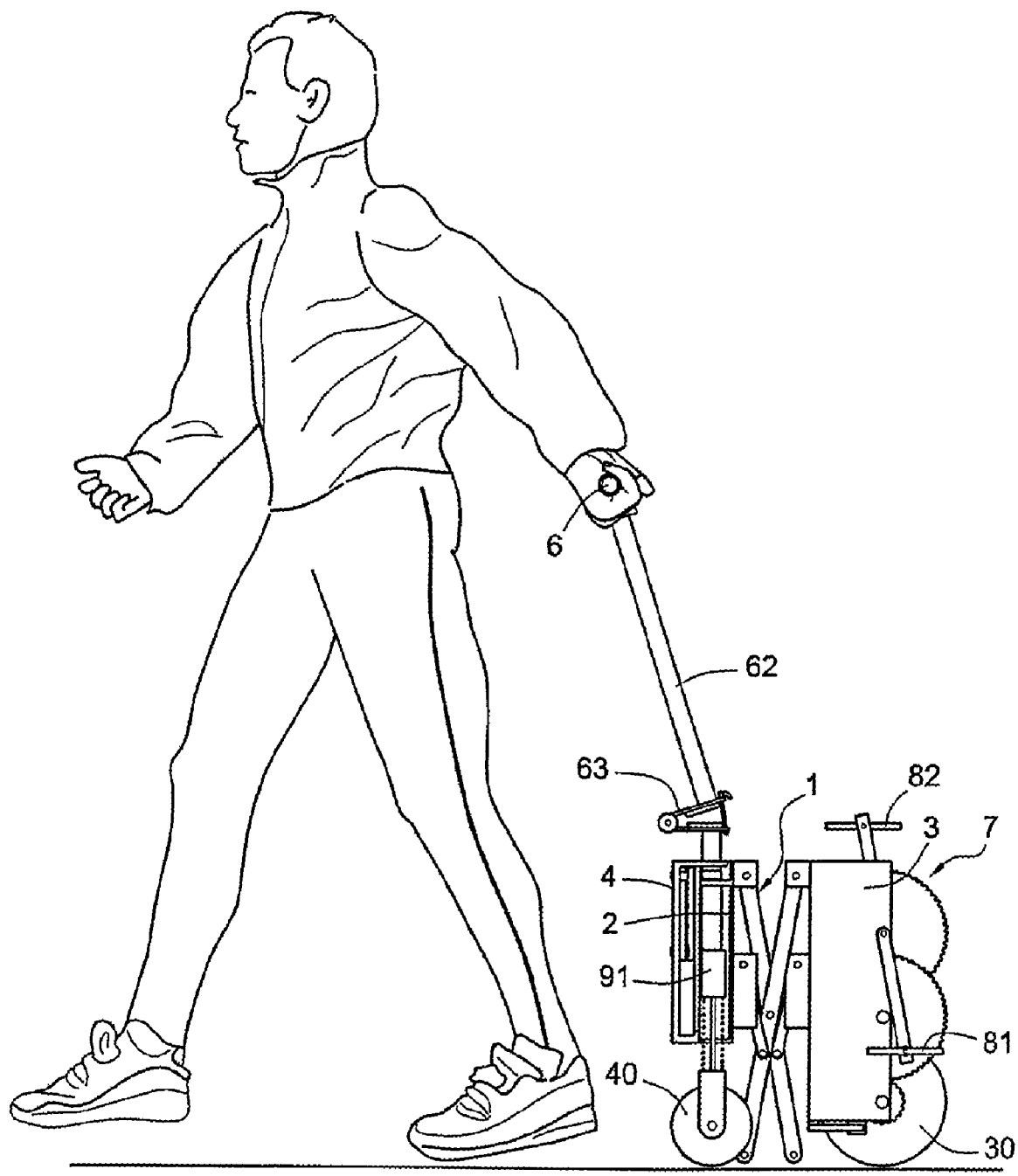
FIG. 15 is another drawing illustrating usage of the device shown in FIG. 2.

When the user wants to travel with the tricycle, he or she first horizontally folds up the front wheel support frame 4 so that the front wheels 40 are against both sides of the handle set 2 (as shown in FIG. 6 and FIG. 7), to reduce the width of the tricycle; then, the handle base 2 and the rear wheel support frame 3 are perpendicularly folded up (as shown in FIG. 8 to FIG. 13), to reduce the length of the tricycle. Accordingly, the tricycle is folded up as a carry-on suitcase, and the two front wheels 40 and the rear wheel 30 remain stably touching the ground. Therefore, the user can hold the handle 6 and easily drag the tricycle around (as shown in FIG. 15), and the folding mechanism 63 can provide a proper dragging angle for the user to drag the tricycle along with him or her. Moreover, the handle 6 can also be shortened (as shown in FIG. 14) and folded to 180°, to further reduce the height and length of the tricycle for storage.

According to the above-mentioned description, the two foldable frames 5 can be folded up, the main frame 1 can be shortened, and the handle 6 can also be folded down, so the tricycle can be folded in all three different dimensions. Furthermore, after the foldable frames 5 and the main frame 1 are folded, the relative positions of the two front wheels 40 and the rear wheel 30 are maintained, therefore, the tricycle can still have mobility. In addition, the folded tricycle is portable and movable, which is convenient for the user to travel with and store. The jogging tricycle of the present invention has a portable size, is easy to operate, and has a strong flexible structure.

Figure 16:
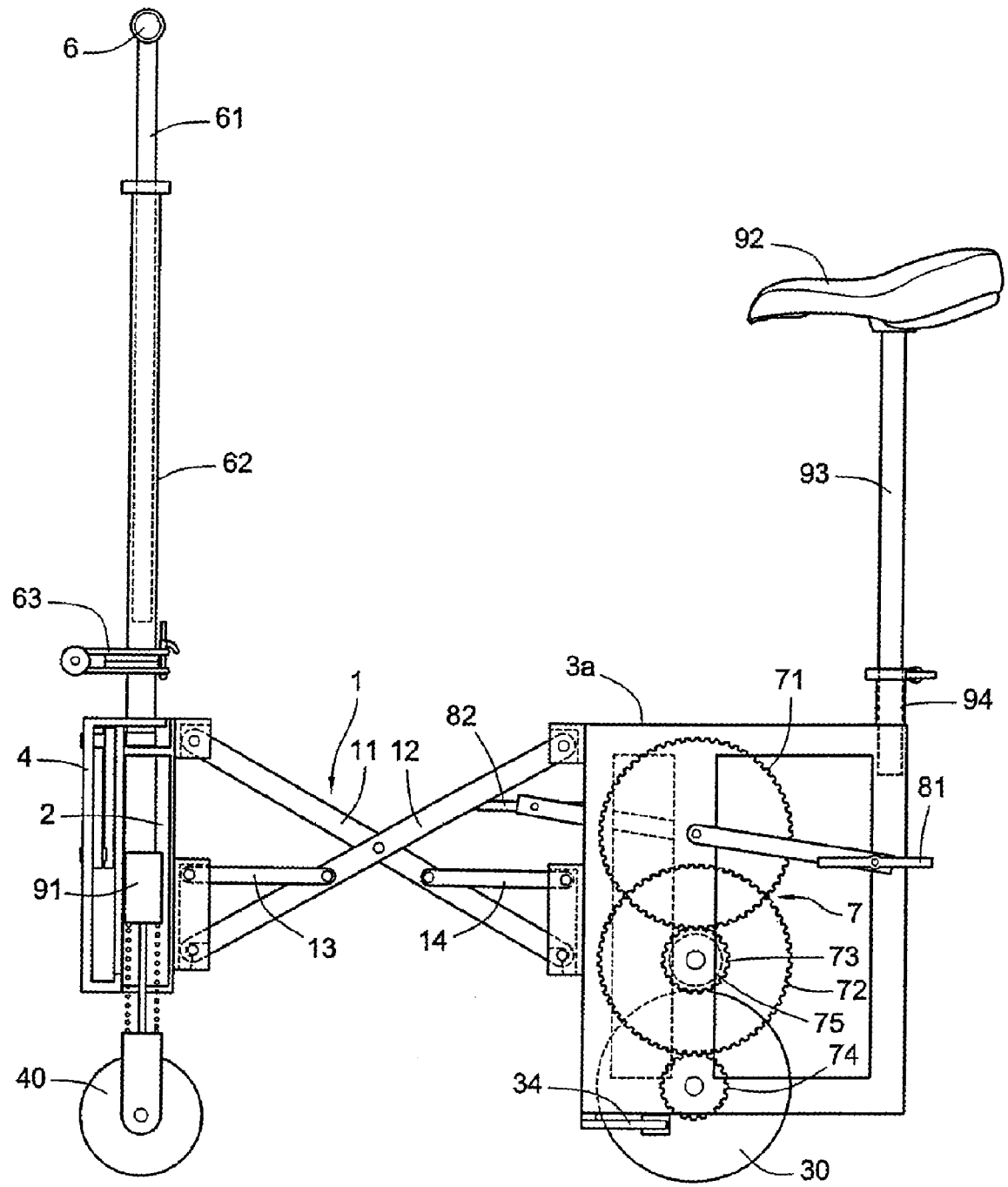
FIG. 16 is a schematic drawing of a second embodiment of the present invention.
Figure 17:
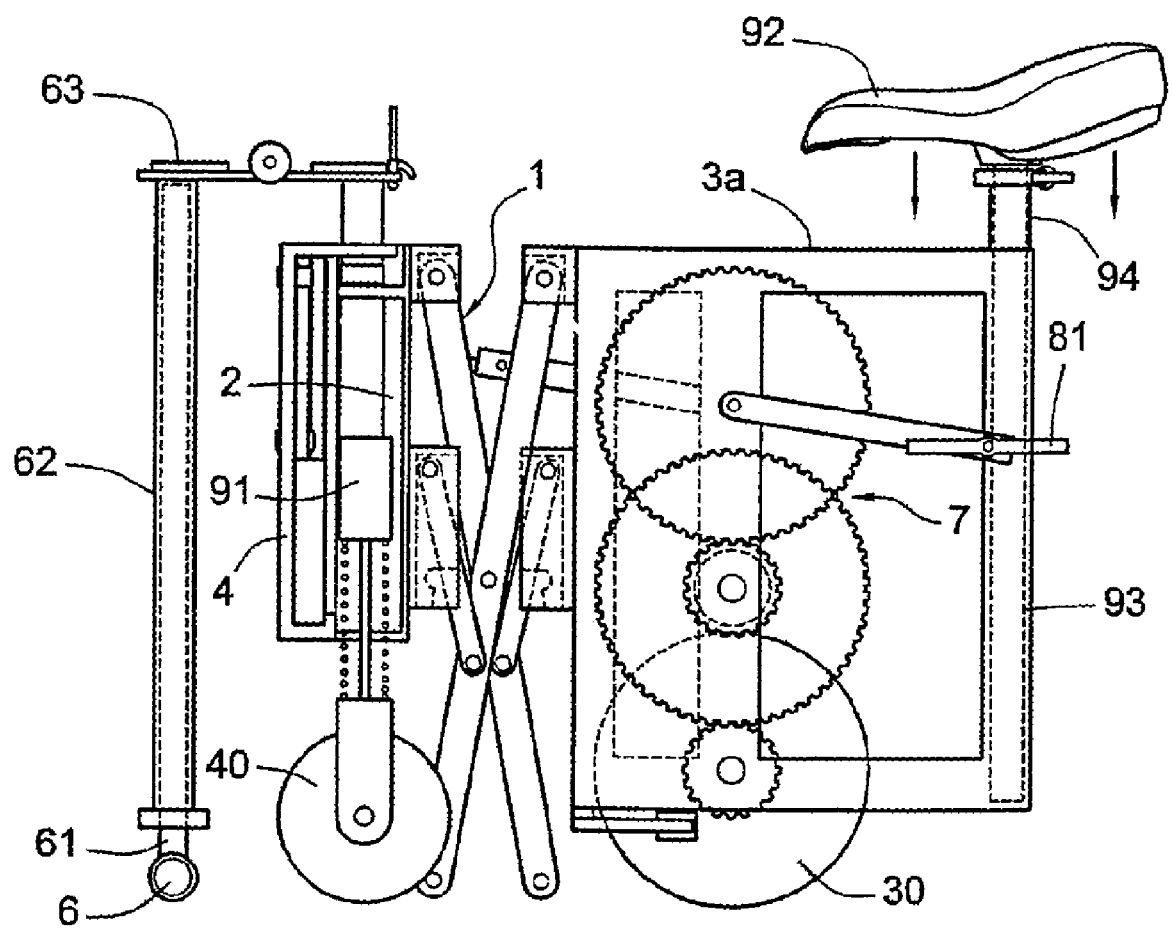
FIG. 17 illustrates usage of the device shown in FIG. 16.

Please refer to FIG. 16. FIG. 16 is a schematic drawing of a second embodiment of the present invention. A seat 92 is installed on the top of the rear wheel support frame 3a, and a plurality of telescoping tubes are disposed between the seat 92 and the rear wheel support frame 3a. The plurality of telescoping tubes comprise a movable tube 93 and a fixed tube 94; the movable tube 93 is attached to the bottom of the seat 92 and the fixed tube 94 is attached to the top of the rear wheel support frame 3a and extends into the rear wheel support frame 3a so that the seat 92 is capable of being lifted or lowered (as shown in FIG. 17).

Although the present invention has been explained in relation to its preferred embodiment, it is to be understood that many other possible modifications and variations can be made without departing from the spirit and scope of the invention as hereinafter claimed.

What is claimed is:

1. A portable jogging tricycle comprising:
   a main frame having two ends respectively connected to a handle base and a rear wheel support frame, a first guiding slot disposed adjacent to a bottom end of the handle base, and a rear wheel pivoted to a bottom end of the rear wheel support frame;
   at least two front wheel support frames respectively connected to sides of the handle base, a front wheel pivoted to a bottom of each front wheel support frame to form a common plane with the two front wheels and the rear wheel, a second guiding slot disposed adjacent to a bottom end of each front wheel support frame and symmetrical with the first guiding slot of the handle base; and
   at least two foldable frames respectively attached to each front wheel support frame on sides of the handle base and comprising a plurality of scissor lifts pivoted between the handle base and the front wheel support frame, ends of at least two scissor lifts of the foldable frame respectively slidably attached to the first and second guiding slots of the handle base and the front wheel support frame to close or open the foldable frames.

2. A portable jogging tricycle comprising:
   a main frame having two ends respectively connected to a handle base and a rear wheel support frame, a front slot disposed on a bottom end of the handle base, a rear slot disposed on a bottom end of the rear wheel support frame, and a rear wheel pivoted to a bottom end of the rear wheel support frame;
   at least two front wheel support frames respectively connected to sides of the handle base, a front wheel pivoted to a bottom of each front wheel support frame to form a common plane with the two front wheels and the rear wheel; and
   the main frame further comprising a plurality of scissor lifts pivoted between the handle base and the rear wheel support frame, ends of at least two scissor lifts of the main frame respectively attached to the front and rear slot to expand the handle base and the rear wheel support frame and being capable of detaching from the front and rear slot to fold the handle base and the rear wheel support frame together.

3. A portable jogging tricycle comprising:
   a main frame having two ends respectively connected to a handle base and a rear wheel support frame, a first guiding slot disposed adjacent to a bottom end of the handle base, a front slot disposed on a bottom end of the handle base, a rear slot disposed on a bottom end of the rear wheel support frame, and a rear wheel pivoted to a bottom end of the rear wheel support frame;
   at least two front wheel support frames respectively connected to sides of the handle base, a front wheel pivoted to a bottom of each front wheel support frame to form a common plane with the two front wheels and the rear wheel, a second guiding slot disposed adjacent to a bottom end of each front wheel support frame and symmetrical with the first guiding slot of the handle base;
   at least two foldable frames respectively attached to each front wheel support frame on sides of the handle base and comprising a plurality of scissor lifts pivoted between the handle base and the front wheel support frame, ends of at least two scissor lifts of the foldable frame respectively slidably attached to the first and second guiding slots of the handle base and the front wheel support frame to close or open the foldable frames; and
   the main frame further comprising a plurality of scissor lifts pivoted between the handle base and the rear wheel support frame, ends of at least two scissor lifts of the main frame respectively attached to the front and rear slot to expand the handle base and the rear wheel support frame and capable of detaching from the front and rear slots to fold the handle base and the rear wheel support frame together.

4. The portable jogging tricycle as claimed in claim 1, wherein the first and second guiding slots are disposed vertically.

5. The portable jogging tricycle as claimed in claim 1, wherein a first pivot shaft is disposed at a top end of the handle base above the first guiding slot, a second pivot shaft is disposed at a top end of the front wheel support frame, and an end of each scissor lift of the foldable frames is pivoted onto the first pivot shaft and the second pivot shaft.

6. The portable jogging tricycle as claimed in claim 5, wherein the foldable frames comprise:
   a first rod having one end pivoted onto the first pivot shaft of handle base;
   a second rod having one end pivoted onto the second pivot shaft of the front wheel support frame, and other ends of the first rod and the second rod being pivoted together;
   a third rod having one end slidably attached to the first guiding slot of the handle base, and a middle position of the third rod pivoted onto a middle position of the first rod; and
   a fourth rod having one end attached to the second guiding slot of the front wheel support frame, other ends of the third rod and the fourth rod being pivoted together, and a middle position of the fourth rod being pivoted onto a middle position of the second rod.

7. The portable jogging tricycle as claimed in claim 2, wherein a first pivot shaft is disposed at a top end of the handle base above the front slot, a second pivot shaft is disposed at a top end of the rear wheel support frame, and an end of each scissor lift of the foldable frames is pivoted onto the first pivot shaft and the second pivot shaft.

8. The portable jogging tricycle as claimed in claim 7, wherein the main frame further comprises:
   a first arm having one end pivoted onto the first pivot shaft of the handle base, and another end of the first arm is attached to the rear slot;
   a second arm having one end pivoted onto the second pivot shaft of the rear wheel support frame, another end of the second arm attached to the front slot, and a middle position of the second arm is pivoted onto a middle position of the first arm;
   a first pole having one end pivoted to a middle position of the handle base and another end pivoted between a middle position of the second arm and its lower end to guide the lower end of the second arm to engage or disengage with the front slot; and
   a second pole having one end pivoted to a middle position of the first arm and another end pivoted between a middle position of the first arm and its lower end to guide the lower end of the first arm to engage or disengage with the rear slot.

9. The portable jogging tricycle as claimed in claim 2, wherein the front slot faces downward and toward the rear wheel support frame, and the rear slot faces downward and toward the handle base.

10. The portable jogging tricycle as claimed in claim 1, wherein the handle base further includes a handle at its top end, and a plurality of telescoping tubes enable the handle to be extended or shortened, and a foldable mechanism is disposed between the handle and the handle base and used for folding up or opening the handle.

11. The portable jogging tricycle as claimed in claim 1, wherein the rear wheel support frame further comprises a gear set, the rear wheel is driven by the gear set, and two pedal are respectively installed on both sides of the rear wheel support frame and used for driving the gear set.

12. The portable jogging tricycle as claimed in claim 11, wherein the gear set comprises:
   a first large gear coaxial with the pedals and driven by the pedals;
   a first small gear placed below the first large gear, engaged with the first large gear, and being driven by the first larger gear;
   a second large gear coaxial with the first small gear and driven by the first small gear; and
   a second small gear placed below the second large gear, engaged with the second large gear, and being coaxial with the rear wheel and driven by the second larger gear.

13. The portable jogging tricycle as claimed in claim 1, wherein the top end of the rear wheel support frame has a seat, there are a plurality of telescoping tubes enabling the seat to be extended or shorten.

14. The portable jogging tricycle as claimed in claim 1, wherein a shock buffer is installed between the front wheel and the front wheel support frame.

* * * * *